Patented June 6, 1939

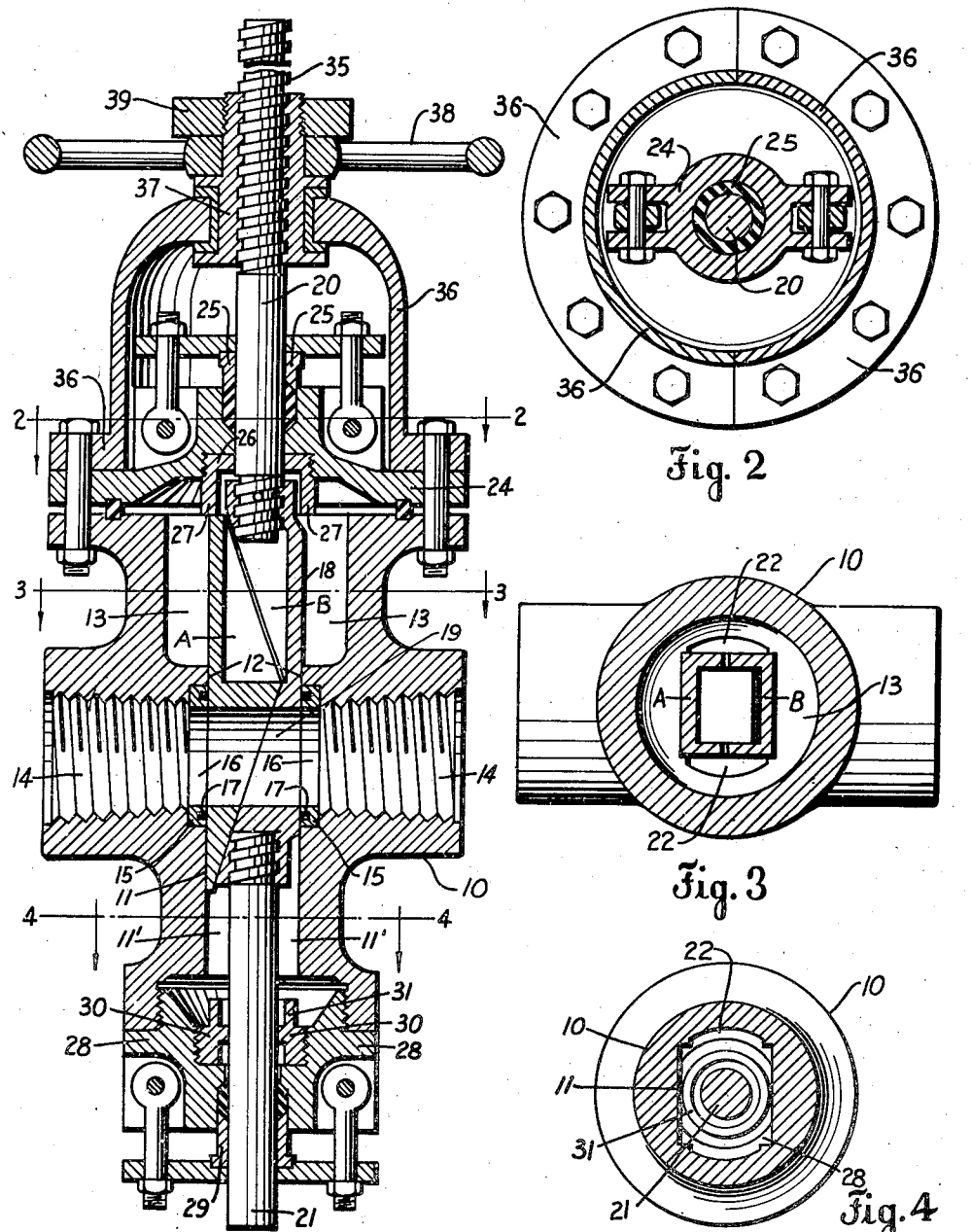

2,161,175

UNITED STATES PATENT OFFICE 2,161,175

VALVE

Milton P. Laurent, Houston, Tex., assignor to W. K. M. Company, Incorporated, Houston, Tex., a corporation of Texas Application November 9, 1936, Serial No. 109,843

4 Claims. (Cl. 251—51)

This invention relates to new and useful improvements in valves.

One object of the invention is to provide an improved valve of the balanced gate type.

An important object of the invention is to provide a valve having a lubricant chamber extending above and below the fluid passage ports of the valve housing, and a gate slidable in said chamber, exposing substantially equal areas at its top and bottom, whereby it is balanced against pressure in said chamber and may be freely moved.

A further object of the invention is to provide a valve of the character described, wherein the gate is movable within a valve chamber, which is provided with means for by-passing fluid or grease in the chamber around the gate when the latter is opened or closed, whereby said chamber is maintained full of said fluid or grease at all times, and also, whereby said fluid or grease does not interfere with the operation of the gate.

Another object of the invention is to provide an improved valve so constructed that the operating stem and the pilot stem displace substantially the same amount of lubricant, whereby a balanced valve is had.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a vertical, sectional view of a valve constructed in accordance with the invention, the gate being in its open position, Figure 2 is a horizontal, cross-sectional view taken on the line 2—2 of Figure 1, Figure 3 is a similar view taken on the line 3—3 of Figure 1, and Figure 4 is a similar horizontal, cross-sectional view taken on the line 4—4 of Figure 1.

In the drawing, the numeral 10 designates a cylindrical valve body or casing. While the invention may be applied to various types of valves, I have selected for the purpose of illustration a valve of the wedge block gate and rising stem type, similar to that shown in my Letters Patent Reissue No. 20,101, issued September 8, 1936.

The valve body or casing 10 is provided with a central valve chamber 11, which extends substantially throughout the length thereof. The lower end 11' of the chamber is substantially rectangular in cross-section (Figure 4), and its side walls are flat, extending in parallel relation to each other to form vertical guide faces 12. The upper end of the chamber is enlarged, as shown at 13, to form a lubricant reservoir. Diametrically opposed flow ports 14 extend laterally from the upper end of the guide faces 12 of the lower portion of the chamber, and are internally threaded in the usual manner. The inner end of each port is surrounded by an angular recess 15 formed in each face 12, which recess receives a seat ring 16. The ring lies substantially flush with the face 12, and is grooved to receive a spring pressed sealing ring 17.

A gate 18 having an opening 19 in its lower portion, is mounted to slide vertically in the chamber between the guide faces 12 in contact with the sealing rings 17 and seat rings 16, and obviously the portion of the gate within the chamber controls the flow of fluid through the ports 14. The gate includes wedge blocks A and B of the type referred to in the aforesaid Letters Patent. An actuating stem 20, having its lower end threaded into the block B, and is fastened therein against independent rotation. The stem extends upwardly from the body 10 and its upper end is provided with a worm gearing 35, preferably formed integrally therewith. A bell-shaped cap member 36 is mounted on the upper end of the body 10 and has journaled in its apex or dome a rotatable collar 37, the bore of which is formed to correspond to the worm gearing 35 on the stem 20. A suitable hand wheel 38 is mounted on the upper end of the collar and is fastened thereon by a flat nut 39. Thus, it will be seen that by turning the wheel 38, the collar 37 is rotated and the stem 20 is raised or lowered, due to the screw jack action of the worm gearing 35 and the bore of the collar 37. The block A has no direct connection with the stem and, therefore, is carried by the block B and free to undergo minute, independent vertical movement with relation thereto, and to operate the blocks and force them into contact with the faces 12, whereby when fluid is flowing through the opening in the gate and the ports, such fluid cannot leak into the gate chamber.

A bonnet 24 is bolted onto the top of the body 10 to close the upper end of the chamber 11, and is provided with a stuffing box 25 through which the stem 20 passes. A guide bushing 26 is screwed into the underside of the bonnet and surrounds the stem 20, at the top of the chamber 13. This bushing has a depending flange 27, which is adapted to be engaged by the upper end of the block A, whereby said block is held stationary while the block B continues its upward movement and the blocks are forced outwardly against the guide faces 12. Although the stem 20 is shown as threaded into the block B, it may be otherwise fastened. It is noted that the parts hereinbefore described are all of the usual construction of valves of this class, and therefore, are not claimed as part of the invention.

Depending from the bottom of the block B of the gate 18 through the lower end of the lubricant chamber 11', is a guide or pilot stem 21. It will be seen that the stem 21 is of substantially the same diameter as the operating stem 20. As the stem 20 is lowered into the upper part of the chamber 13 to close the gate, the stem 21 is moved downwardly out of the lower part of the chamber 11', when the gate is moved to its open position, the stem 21 is lifted upwardly into the lower part of said chamber and the stem 20 is raised out of said chamber. The stems 20 and 21 are of substantially the same diameter, and the top and bottom of the gate 18 exposes substantially equal areas within the chamber 11, therefore, pressure in said chamber above and below the gate will be equalized thereon and the gate balanced. For by-passing the fluid from one end of the chamber to the other as said gate is raised and lowered, vertical passage ways 22 have been provided in the body 10 on opposite sides of the gate, whereby the fluid is free to pass from one end of the chamber 11 to the other. As the gate is lowered, the fluid will be forced upwardly through the passage ways 22 into the upper portion of said chamber and as the gate is raised the fluid will be by-passed downwardly through the passage ways. A plug 28, similar to the bonnet 24, is threaded into the lower end of the valve body 10, and has a stuffing box 29 and a bushing 30 provided with an upstanding flange 31. The lower end of the block A engages the flange upon the downward movement of the gate, whereby the block A is stopped before block B, so that the gate is spread and wedges the blocks A and B between the guide faces 12.

In operation, assuming the valve to be in the position shown in Figure 1, which is the open position, the wheel 38 is rotated in the usual manner to lower the gate 18 to its closed position. The lower end of the block A comes in contact with the flange 31, thereby expanding the gate 18 against the guide faces 12 and the rings 16 and 17, as has been explained. When said gate is lowered into the lower reduced end 11' of the chamber 11 of the valve body 10, a proportionate amount of lubricant is displaced and flows upwardly through the by-passes 22, into the upper enlarged portion 13 of the chamber 11. As the stem 20 is forced downwardly into the upper end of the chamber 11, the stem 21 is moved downwardly out of the lower end 11' of said chamber, and the two stems being of substantially the same area, there remains in said chamber, both above and below the gate, at all times, the same proportionate amount of stem, which results in an equal displacement of lubricant in said chamber in all positions of the gate valve. Thereby, the creation of a vacuum on either side of the valve is eliminated, and the operation of the valve may be readily accomplished.

It is pointed out that with the arrangement above described, the gate is balanced against pressures on each side thereof. The provision of the lower stem not only provides a guide for the gate, but since it has substantially the same cross-sectional area as the operating stem, it provides an equal exposed area at the top and bottom of the gate, which brings about the balanced conditions. The vertical by-passes disposed on each side of the gate are of sufficient size to permit a free, unrestricted flow therethrough, whereby a back pressure is not created in one end of the chamber when the gate is actuated.

In some instances, a lubricant is introduced into the chamber 11 under pressure, and upon the opening and closing of the valve, the displacement of the lubricant is equal, and should the stem 21 not be used, the valve would become unbalanced and the purpose of the invention would be defeated.

What I claim and desire to secure by Letters Patent is:

1. The herein described gate valve for use in a fluid line including, a body having a lubricant chamber containing a liquid other than the line fluid and opposed gate guides intermediate the ends of said chamber, said body having a transverse fluid passageway with port openings within said gate guides, a reciprocatory gate slidable in said guides and provided for opening and closing said ports as to communication between the ports but constantly preventing communication between the ports and said lubricant chamber, said chamber having by-pass communication between its ends at opposite sides of the gate and the gate exposing substantially equal areas at its ends to said chamber, an operating stem extending from one end of the gate, and a pilot stem extending from the opposite end of the gate, said stems being of substantially the same area of displacement in said lubricant chamber.

2. A valve for use in a fluid line including, a valve body having an upright chamber therein containing a liquid other than the line fluid provided with a restricted gate guide intermediate its ends, a reciprocatory gate block having a close sliding fit in the guide of the chamber and preventing passage of fluid from one end of said chamber to the other between coacting guide surfaces, the chamber of the body having by-passes at opposite sides of the gate connecting its extremities, said gate exposing substantially equal areas at the upper and lower portions of the chamber of the body, an operating stem at the upper end of the gate for raising and lowering the gate and a pilot stem depending from the lower end of said gate and guided in the body, said stems having substantially the same area of displacement.

3. A valve for use in a fluid line having a valve body with opposed gate guides, a valve chamber in said body containing a liquid other than the line fluid, a reciprocatory gate block mounted in said chamber in close sliding contact with said guides, a by-pass communicating the opposed portions of said chamber at opposite ends of said gate block, an operating stem at one end of said gate block for raising and lowering the gate, and a member at the opposite end of the gate block occupying an area of displacement in the adjacent portion of said chamber substantially equal to said operating stem for all positions of the valve to render displacement of the gate block and operating mechanism in the chamber constant throughout its operation.

4. A valve for use in a fluid line having a valve body with opposing gate guides, a valve chamber in said body containing a liquid other than the line fluid, a reciprocatory gate block mounted in said chamber in close sliding contact with said guides, a by-pass communicating opposed portions of said chamber at opposite ends of said gate block, an operating stem at one end of the gate block for raising and lowering the gate, and means associated with the end of the gate block opposite that to which the said stem is connected whereby the said latter end is caused to occupy an area of displacement in the adjacent portion of said chamber substantially equal to the area occupied by the opposed end of the block plus the operating stem for all positions of the valve to thereby render displacement of the gate block and operating mechanism in the chamber substantially constant throughout its operation.

MILTON P. LAURENT.